Aug. 30, 1932.  C. W. LAMBERT  1,874,053
AUTOMATIC PROPELLER PITCH CHANGER
Filed June 21, 1930
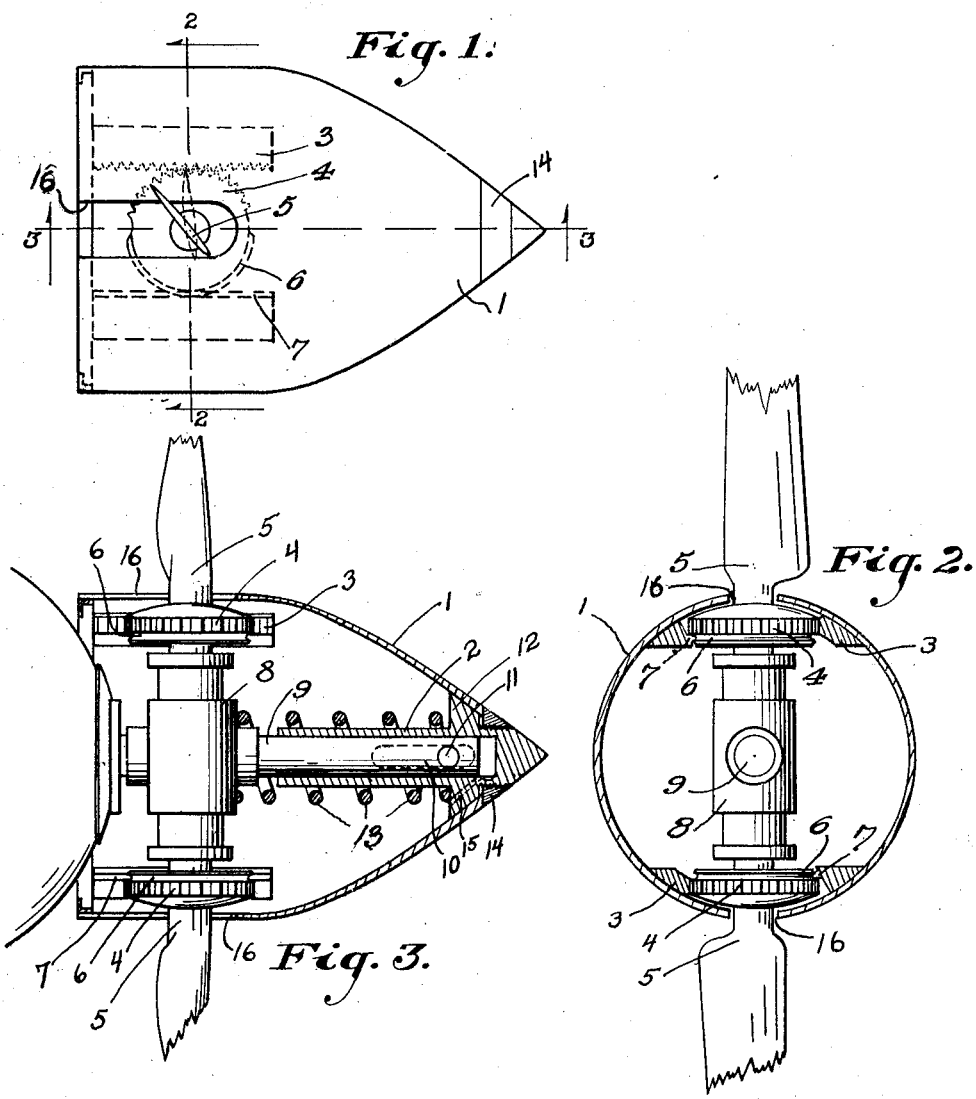
INVENTOR.
Chandley William Lambert.
BY
ATTORNEY.

Patented Aug. 30, 1932

1,874,053

UNITED STATES PATENT OFFICE

CHANDLEY WILLIAM LAMBERT, OF CLEVELAND, OHIO

AUTOMATIC PROPELLER PITCH CHANGER

Application filed June 21, 1930. Serial No. 462,877.

The invention relates to improvements in screw propeller pitch changers and provides an automatic control of the propeller pitch, causing the pitch to vary correspondingly with changes of the air-speed of the aircraft or water-speed of the watercraft.

The objects of the invention are first, to maintain the propeller at an efficient pitch for the fluid-speed of the craft, second to constantly vary the propeller pitch with changes of the fluid-speed of the craft, and third, to accomplish these results automatically without necessitating any effort on the part of the operator or pilot, thus leaving him completely free for other activities.

The tactical advantages of a combat plane so equipped are enormous, while the saving of fuel, increase of speed, quick take-off, steep climbing ability, and practical freedom from stalling are other military and commercial advantages. The same applies to any watercraft which frequently changes its speed.

Briefly stated the invention is;—a movable pressure plate and means for transmitting said movement to vary the pitch of a screw propeller.

One form of the invention is shown in the accompanying drawing, in which Fig. 1 is a plan view of the pitch changer; Fig. 2 an end elevation, partly in section, along line 2—2 of Fig. 1; Fig. 3 a side elevation, also partly in section, along the line 3—3 of Fig. 1.

The parts are numbered the same in all figures of the drawing. In Fig. 1, 1 is a conical pressure plate, mounted on a restrictedly slidable sleeve 2, (Fig. 3). The pressure plate 1, has attached on its inner surface, a rack 3, Figs. 1-2-3, which meshes with a gear wheel or quadrant 4, which is secured to a rotatable propeller 5, Figs. 1-2-3, which projects through opening 16 of the rearwardly extending cylindrical skirt of pressure plate 1.

The gear wheel 4 has an annular groove 6, Figs. 1-2-3, sliding on the guide 7, secured within pressure plate 1.

In Figs. 1-2-3 of the drawing is shown an opening in the cylindrical skirt of pressure plate 1, thru which the shank of blade 5 is seen to project.

The rotatable propeller blades 5, 5, are carried by the hub 8, Figs. 2-3, fixed to shaft 9, on the forwardly extending part of which shaft, the loose sleeve 2, Fig. 3, is longitudinally slidable to a restricted extent.

The sleeve 2, Fig. 3, has a closed groove 10 in which slides a pin 11 which is fixed to shaft 9. This closed groove 10 and pin 11 cause the shaft and sleeve to revolve together and also limit the longitudinal motion of the sleeve with respect to the shaft.

The sleeve 2 has a shoulder 12, Fig. 3, between which and hub 8 is a compression spring 13. A lock-nut 14, Figs. 1, 3, secures the conical plate 1 against the shoulder 12 of sleeve 2. In Fig. 3, 15 is a vent for the sleeve interior.

To avoid confusion, forms of "rotate" as "rotatably" are used to designate the motion of the propeller blade, independently of the hub, around the propeller axis; and forms of "revolve" as "revolvably" are used to designate the revolving motion of the propeller shaft and the parts that revolve therewith.

The operation of the automatic propeller pitch changer is as follows; the fluid, through which the pressure plate is forced, by the forward motion of the aircraft or watercraft, impinges upon the outer or forward surface of the pressure plate with a force which increases with increased fluid-speed; i. e. as the air-speed of the air-craft; compressing the spring and turning or rotating the propeller blades into a position of higher pitch. When the fluid-speed of the craft is decreasing, the fluid pressure upon the pressure plate is decreasing, thus allowing the spring to move the plate forward, rotating the propeller blades into a position of lower pitch. Thus the propeller blades tend to assume a pitch corresponding to the fluid-speed of the craft.

Having described the invention, what I claim as new and useful is,

1. In combination, a propeller shaft, a loose sleeve on said shaft, a means for revolving said sleeve with said shaft, a means for limiting longitudinal motion of said sleeve on said shaft, a conical pressure plate secured to said sleeve, a compression spring coaxial with said sleeve, a longitudinally placed gear rack secured to the inner surface of said pressure plate, a guide secured to the inner surface of said pressure plate parallel to said rack, a propeller blade extending normally outwardly from said propeller shaft, a gear wheel secured to said propeller blade cooperably with said rack, an annular groove in said gear wheel forming slidable contact with said guide.

2. In combination, a propeller shaft, a propeller hub secured to said shaft, a propeller blade rotatably mounted in said hub, a restrictedly slidable sleeve on said shaft, forwardly of said hub, a shoulder on said sleeve, a compression spring coaxial with said shaft between said hub and said shoulder, a conical pressure plate, said plate having a cylindrical skirt extending rearwardly in the region of said hub, an opening in said skirt through which said blade projects, a means for securing said plate to said sleeve, a gear rack secured within said cylindrical skirt, a gear wheel on said blade, and a means for securing continuous engagement between said gear wheel and said rack, and a means for venting the interior of said sleeve.

3. A propeller shaft, a hub secured to said shaft, rotatable propeller blades mounted in said hub, a loose sleeve slidable on said shaft forwardly of said hub, means for revolving said sleeve with said shaft, means for limiting said sliding motion of said sleeve on said shaft, a pressure plate secured to said sleeve, a compression spring mounted co-avially with said sleeve and said shaft between said plate and said hub, a rearwardly extending skirt on said plate, openings in said skirt, said blades projecting through said openings allowing longitudinal movement of said skirt and plate, means whereby said movement of said plate is transmitted to said rotatably mounted propeller blades to rotate same.

4. A fluid pressure plate secured to a sleeve, said sleeve restrictedly slidable on a propeller shaft, a spring balancing the pressure on said plate, rotatably mounted propeller blades, sector gears secured to said blades, parallel longitudinal racks secured to said plate, means for securing positive cooperation of said gears with said racks.

CHANDLEY WILLIAM LAMBERT.